United States Patent [19]
Owensby

[11] Patent Number: 5,702,739
[45] Date of Patent: Dec. 30, 1997

[54] SIMPLIFIED METHOD OF CODING PACKAGES AND CODED PACKAGES PRODUCED BY SUCH METHOD

[75] Inventor: Joseph E. Owensby, Spartanburg, S.C.

[73] Assignee: W. R. Grace & Co.-Conn., Duncan, S.C.

[21] Appl. No.: 597,591

[22] Filed: Feb. 6, 1996

[51] Int. Cl.⁶ .................................................. A22C 17/10
[52] U.S. Cl. ........................ 426/87; 53/434; 53/507; 53/512; 206/459.5; 383/103; 383/127; 426/129; 426/383
[58] Field of Search ............................ 53/131.2, 131.4, 53/131.5, 434, 512, 507, 508; 206/459.5; 426/87, 127, 129, 383; 383/127, 103; 235/375; 283/74, 117, 901

[56] References Cited

U.S. PATENT DOCUMENTS

| | | |
|---|---|---|
| 1,859,467 | 5/1932 | Rath .................................. 426/87 |
| 1,995,725 | 3/1935 | Wappler ............................. 426/383 |
| 2,433,622 | 12/1947 | Novak ............................... 426/383 |
| 5,330,777 | 7/1994 | Mize et al. .......................... 426/87 |
| 5,576,037 | 11/1996 | Moore et al. ....................... 426/129 |

*Primary Examiner*—Joseph W. Drodge
*Attorney, Agent, or Firm*—Mark B. Quatt

[57] ABSTRACT

A method of coding a package for identification includes the steps of providing a package including a product in a bag, the bag having a tail portion; and positioning at least one cut in the tail portion of the bag, the at least one cut having a pre-selected characteristic, wherein the pre-selecting characteristic comprises a code for identification. A coded package comprises a bag; and a product positioned within the bag, the bag having at least one cut positioned therein, the at least one cut having a pre-selected characteristic which comprises a code for identification, the bag being sealed between the product and the at least one cut. A system for providing a coded package includes a manner providing a product in a bag; a manner of vacummizing the bag; a manner of making a cut in the bag; and a manner of sealing the bag.

17 Claims, 3 Drawing Sheets

 0
 1
 2
 3
 2
 3
 0
 1
FIG. 5A
FIG. 5B

SIMPLIFIED METHOD OF CODING PACKAGES AND CODED PACKAGES PRODUCED BY SUCH METHOD

BACKGROUND OF THE INVENTION

The invention relates to a method of coding packages, especially fresh red meat or cheese packages, for identification, wherein the packages are made by placing a product in a bag, and then sealing the bag to contain the product.

Many types of fresh red meat packages require an identification code such as a USDA plant code so as to provide a method for meat packers and the like to identify their packages. Codes are also required for other perishable products depending upon the type of product being packaged.

Currently, packages for products such as fresh red meats and the like are individually printed with a USDA logo and a manufacturers code. Printing works well for the identification of the package, but results in an increased cost due to the necessity of maintaining many differently printed quantities of the same basic bag in inventory.

Furthermore, whether bags are conventionally printed prior to use of the bag, or are printed as a separate step during the preparation of a package, the printing of the desired code results in an additional step with respect to the overall packaging procedure.

It is not desirable to place the codes on the bag at the time of their manufacture because doing so requires the duplication of inventories, etc., resulting in increased costs and reduced flexibility in meeting customers expectations of having materials on hand. Bags which are pre-made are inherently difficult to code because they are not presented to a coding device in a uniform geometry or placement during the packaging process. As such, it is difficult to accurately locate a suitable area for placing a code on these packages, and a suitable means for placing the code on the package.

The need remains for a method of coding packages which is simple, inexpensive, efficient and reliable.

SUMMARY OF THE INVENTION

A method is provided according to the invention for coding a package, which method comprises the steps of providing a package comprising a product in a bag, the bag having a tail portion; and positioning at least one cut in said tail portion of said bag, said at least one cut having a pre-selected characteristic, wherein said pre-selected characteristic comprises a code for identification.

Further, a coded package is provided which comprises a bag; and a product positioned within said bag, said bag having at least one cut positioned therein, said at least one cut having a pre-selected characteristic which comprises a code for identification, said bag being sealed between said product and said at least one cut.

Still further, a system for providing coded packages is disclosed, which comprises means for providing a product in a bag; vacuumizing means for vacuumizing said bag; means for cutting at least one cut in said bag so as to allow removal of air from said bag through said at least one cut during vacuumizing, wherein said means for cutting comprising means for providing said at least one cut having a pre-selected characteristic comprising a code for identification; and sealing means for sealing said bag between said product and said at least one cut so as to provide a sealed vacuumized package having said code for identification.

BRIEF DESCRIPTION OF THE DRAWINGS

A detailed description of preferred embodiments of the invention follows, with reference to the attached drawings, wherein:

FIGS. 5A and 5B are examples of codes which may be applied to a package according to the invention.

DETAILED DESCRIPTION

The invention relates to a method of coding a package for identification, more particularly to a method of coding a fresh red meat package for identification of the packing house responsible for the package. Advantageously, a method is provided for applying the desired code to a package during the packaging process, particularly during the vacuumizing step. During vacuumizing, piercing knives are used to provide holes in a bag for a product to allow air to exit the bag during vacuumizing. The piercing knives are arranged or otherwise configured so as to leave a distinct and recognizable cut or series of cuts in the bag, which cut or series of cuts is used for identification purposes.

Figure 1:
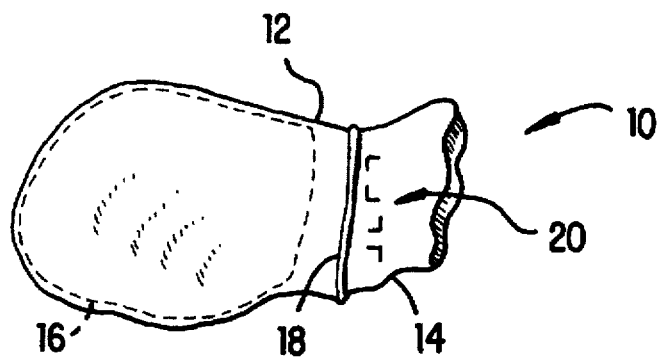
FIG. 1 illustrates a package coded in accordance with the invention.

Referring to FIG. 1, a package 10 according to the present invention is illustrated. As shown, package 10 includes a bag 12 having a bag tail portion 14, a product 16 enclosed within bag 12, a seal 18 positioned so as to seal product 16 within bag 12, and a series of cuts 20 arranged so as to provide identification, preferably identification to allow manufacturers or meat packers to identify their packages.

Figure 2:
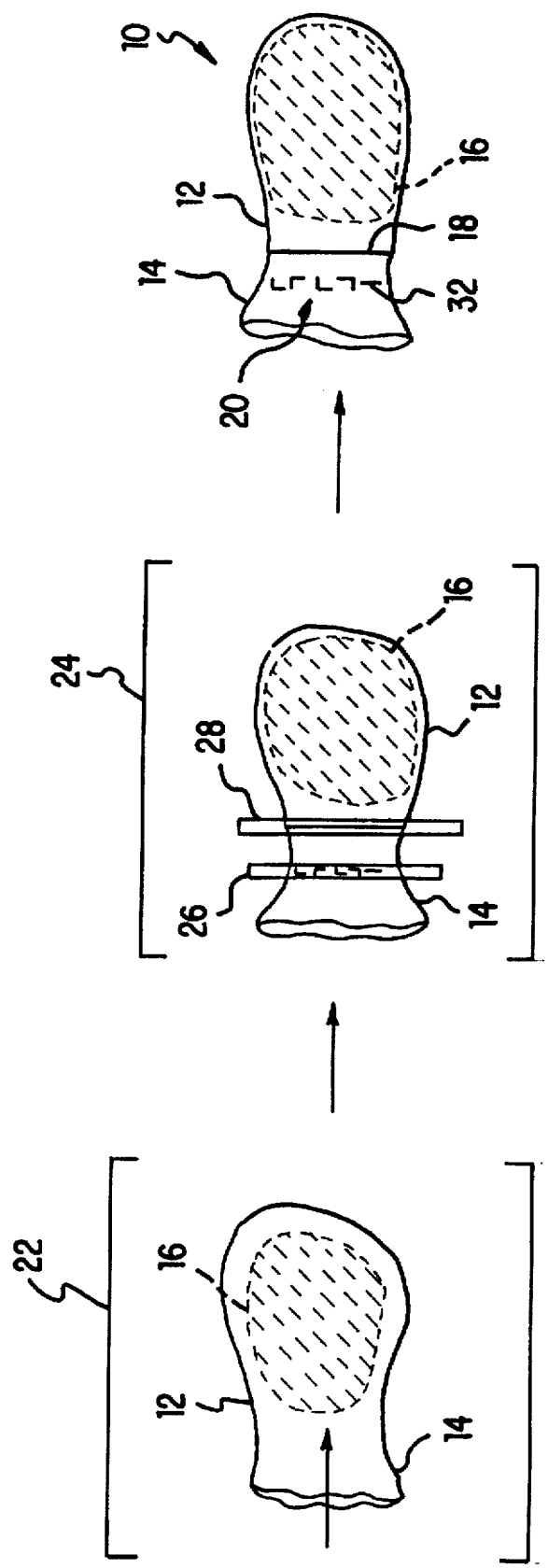
FIG. 2 schematically illustrates a system and method according to the present invention.

Referring to FIG. 2, the method and system of coding packages is further illustrated. As shown in FIG. 2, a product 16 is loaded in a bag 12, for example at a loading station 22, and passed to a vacuumizing station 24 (schematically illustrated). Bag 12 is pierced using a piercing element 26. A vacuum is applied to bag 12, and air exits bag 12 as desired through the pierced holes of the bag. Upon sufficient vacuumizing and removal of air from bag 12, seal member 28 is activated for sealing bag 12 with product 16 therein as desired, so as to provide a sealed and coded package 10.

Still referring to FIG. 2, piercing element 26 is preferably configured so as to provide at least one cut in bag 12 having a preselected characteristic which can be read, scanned or otherwise identified as a code for identifying the packing house which manufactured package 10. The characteristic of cuts provided by piercing element 26 may be the number of cuts, the geometric shape of cuts provided, the orientation of the cuts, and may preferably be a combination of these characteristics.

Figure 3:
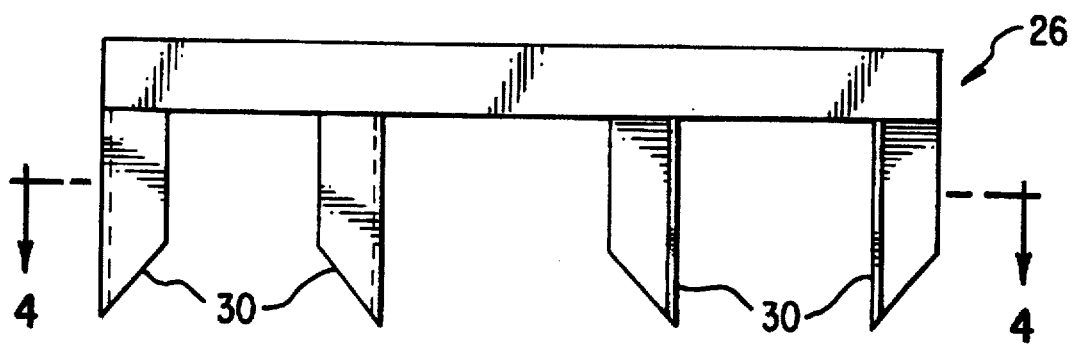
FIG. 3 is a side elevated view of a cutting tool for use in coding packages in accordance with the invention.
Figure 4:
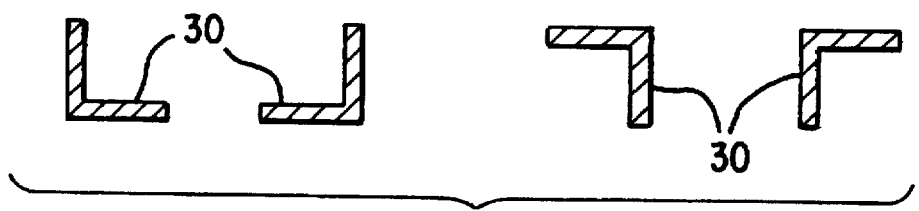
FIG. 4 is a sectional view taken along the line 4—4 of FIG. 3.

Referring to FIG. 3, a piercing element 26 is illustrated. As shown, piercing element 26 may include four piercing knives 30, each having a generally L-shaped cross section as illustrated in FIG. 4. Rotational orientation of each knife 30 provides a differently oriented L-shaped cut in bag 12. Each packing house or package manufacturer would use a different and unique arrangement of knives 30 so that a package 10 includes a code formed by a series of cuts which readily identifies the manufacturer of the package. The structure and orientation of knives 30 of piercing element 26 as illustrated in FIGS. 3 and 4 could be used, for example, to provide the code as shown in package 10 of FIG. 1.

In accordance with the embodiment illustrated in FIGS. 3 and 4, a piercing element 26 is illustrated having four knives 30 each positioned in one of four rotationally different orientations. In this embodiment, each packaging house or manufacturer would use a different combination of rotational orientation of knives 30 which is unique to that particular packaging house. The use of knives 30 having four rotationally different orientations provides a number of unique sequential combinations equal to 4 raised to the power of N, where N is the number of blades to be used. Thus, in the embodiment illustrated, 256 different packaging facilities could be identified. Additional blades could be used if desired, so as to greatly increase the number of different manufacturers which could be identified. For example, the use of seven blades, each having four different potential orientations would provide 17,384 sequential combinations.

It is also noted that various different geometric shapes of knives 30 could be used if desired. For example, knives 30 are illustrated in the drawings as having a simple L-shaped configuration. Knives could be provided having different shapes if desired, and such shapes may be used in a system allowing for other than four rotationally distinct orientations, either more or less as desired, so as to further adapt the number of different combinations available for use to a particular set of circumstances.

In further accordance with the invention, the arrangement of knives 30 as illustrated in FIGS. 3 and 4 could be used to generate a series of numbers in base 4. Referring to FIG. 5A and FIG. 5B, each of the four distinct orientations of cuts is illustrated, along with a base 4 number which could be assigned to that particular orientation. The various different sequential orientations of knives 30 could be stored in a calculator or computer, or provided in a simple table, and correlated to a particular manufacturer's actual USDA code. Thus, each different arrangement of knives 30 according to the invention represents a different base 4 number which is readily converted to a base 10 number indicative of the desired identifying code of the manufacturer. FIG. 5A illustrates an arrangement of knives 30 corresponding to 01 23 as a base 4 code, and equivalent to 027 in base 10. FIG. 5B illustrates a different arrangement of knives 30 which corresponds to 2301 as a base 4 code, and is the equivalent of 177 in base 10.

Returning to FIG. 2, in accordance with an alternative embodiment of the invention, piercing element 26 may further be adapted so as to provide an additional cut 32 for use in indicating the direction in which cuts in bag 12 are to be read. This is particularly advantageous when knives 30 are shaped and oriented to provide codes which are readable from both sides of bag 12. In accordance with this embodiment of the invention, additional cut 32 may be positioned such that cuts 20 must be read with additional cut 32 positioned to the left of cuts 20, thereby readily identifying whether bag 12 is being properly read. Of course, numerous other locations of additional cut 32 would also serve to identify the proper orientation for reading.

Positioning cuts 20 on bag tail 14 of bag 12 provides an advantageous and simple manner of coding packages 10 for identification in that cuts 20 are readily readable on a shrunken package, and that use is thereby made of bag tail 14 as an area to place the desired code. Product 16 may be any product of various size for which coding is desired, such as rib packages, ham packages, packages for small flat products and the like.

The invention is not limited to the illustrations described, which are merely illustrative.

What is claimed is:

1. A method of coding a package for identification, comprising the steps of:

providing a package comprising a product in a bag having a tail portion; and positioning at least one cut in said tail portion of said bag, said at least one cut each or together having a pre-selected characteristic, wherein said pre-selected characteristic comprises a code for identification.

2. A method according to claim 1, wherein said step of positioning said at least one cut further includes the step of removing air from said bag through said at least one cut.

3. A method according to claim 1, further comprising the step of vacuumizing said package so as to remove air from said bag through said at least one cut, and sealing said bag between said product and said at least one cut.

4. A method according to claim 1, further comprising the step of sealing said bag between said product and said at least one cut.

5. A method according to claim 1, further comprising the step of selecting said pre-selected characteristic, said characteristic selected from the group consisting of number of cuts, shape of cuts, orientation of cuts, and combinations thereof.

6. A method according to claim 1, wherein said step of positioning said at least one cut further comprises positioning at least four cuts in said tail portion, said at least four cuts having said pre-selected characteristic, said characteristic selected from the group consisting of number of cuts, shape of cuts, orientation of cuts, and combinations thereof.

7. A method according to claim 1, wherein said pre-selected characteristic is indicative of a manufacturer's USDA code.

8. A method according to claim 1, further comprising the step of providing an additional cut associated with said at least one cut for indicating a proper orientation of said at least one cut for reading, whereby reading of said code is facilitated.

9. A coded package comprising:

a bag; and a product positioned within said bag, said bag having a cut positioned therein, said at least one cut having a pre-selected characteristic which individually or together comprises a code for identification, said bag being sealed between said product and said at least one cut.

10. A coded package according to claim 9, wherein said package is a vacuum package.

11. A coded package according to claim 9, wherein said product is a fresh red meat product.

12. A coded package according to claim 9, wherein said preselected characteristic is selected from the group consisting of number of cuts, shape of cuts, orientation of cuts and combinations thereof.

13. A coded package according to claim 9, wherein said at least one cut further comprises at least four cuts, said at least four cuts having said pre-selected characteristic, said characteristic selected from the group consisting of number of cuts, shape of cuts, orientation of cuts, and combinations thereof.

14. A coded package according to claim 13, wherein said at least one four cuts further comprise an additional cut positioned so as to indicate a proper orientation of said cuts for reading, whereby reading of said code is facilitated.

15. A coded package according to claim 13, wherein said pre-selected characteristic is indicative of a manufacturer's USDA code.

16. A system for providing coded packages, comprising:

means for providing a product in a bag;

vacuumizing means for vacuumizing said bag;

means for cutting a cut in said bag so as to allow removal of air from said bag through said at least one cut during vacuumizing, wherein said means for cutting comprises means for providing said at least one cut each or together having a pre-selected characteristic comprising a code for identification; and sealing means for sealing said bag between said product and said at least one cut so as to provide a sealed vacuumized package having said code for identification.

17. A system according to claim 16, wherein said means for cutting comprises a knife selected to provide said preselected characteristic, said characteristic selected from the group consisting of number of cuts, shape of cuts, orientation of cuts and combinations thereof.

* * * * *

UNITED STATES PATENT AND TRADEMARK OFFICE
CERTIFICATE OF CORRECTION

PATENT NO. : 5,702,739
DATED : December 30, 1997
INVENTOR(S) : Joseph E. Owensby It is certified that error appears in the above-identified patent and that said Letters Patent is hereby corrected as shown below:

Column 4, line 53, delete "at least one four cuts" substitute therefor
--at least four cuts--

Signed and Sealed this

Twenty-first Day of April, 1998

Attest:

BRUCE LEHMAN

Attesting Officer

Commissioner of Patents and Trademarks